US010006380B2

(12) United States Patent
Wakao et al.

(10) Patent No.: US 10,006,380 B2
(45) Date of Patent: Jun. 26, 2018

(54) CONTROL DEVICE FOR INTERNAL COMBUSTION ENGINE

(75) Inventors: Kazuhiro Wakao, Susono (JP); Mie Kato, Susono (JP); Takahiro Tsukagoshi, Susono (JP); Kazuhisa Matsuda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 244 days.

(21) Appl. No.: 14/411,974

(22) PCT Filed: Jul. 6, 2012

(86) PCT No.: PCT/JP2012/067389
§ 371 (c)(1),
(2), (4) Date: Dec. 30, 2014

(87) PCT Pub. No.: WO2014/006761
PCT Pub. Date: Jan. 9, 2014

(65) Prior Publication Data
US 2015/0122218 A1    May 7, 2015

(51) Int. Cl.
*F02D 19/06* (2006.01)
*F02D 41/00* (2006.01)
(Continued)

(52) U.S. Cl.
CPC ....... *F02D 19/0689* (2013.01); *F02D 19/061* (2013.01); *F02D 19/0692* (2013.01);
(Continued)

(58) Field of Classification Search
CPC .......... F02D 19/06; F02D 41/00; F02D 19/08; F02D 41/1441; F02D 19/061;
(Continued)

(56) References Cited

U.S. PATENT DOCUMENTS 7,647,916 B2    1/2010  Leone et al.
8,335,632 B2 * 12/2012  Lippa ................. F02D 19/0684
123/1 A
(Continued)

FOREIGN PATENT DOCUMENTS

JP    2006-214415 A    8/2006
JP    2009121364 A *   6/2009
(Continued)

*Primary Examiner* — Thomas Moulis
*Assistant Examiner* — John Bailey
(74) *Attorney, Agent, or Firm* — Hunton Andrews Kurth LLP

(57) ABSTRACT

An object of this invention is, in an internal combustion engine having of in-cylinder direct injection and port injection, to enable the early elimination of a difference between fuel concentrations of fuel injected from different injection valves that can arise when a mixing ratio of different kinds of fuel contained in the fuel that is used changes significantly. To achieve this, the control device of this invention normally controls a fuel injection amount of each injection valve in accordance with the operating state of the internal combustion engine, while a change arose in the mixing ratio of different kinds of fuel contained in the fuel that is used or while there is a possibility for such a change, the control device controls a fuel injection amount of each injection valve so that fuel is temporarily injected from both the in-cylinder injection valve and the port injection valve.

11 Claims, 2 Drawing Sheets

(51) Int. Cl.
*F02D 19/08* (2006.01)
*F02D 41/30* (2006.01)
*F02D 41/38* (2006.01)
*F02D 41/14* (2006.01)

(52) U.S. Cl.
CPC .......... *F02D 19/08* (2013.01); *F02D 19/084* (2013.01); *F02D 19/087* (2013.01); *F02D 41/008* (2013.01); *F02D 41/0025* (2013.01); *F02D 41/3094* (2013.01); *F02D 19/0605* (2013.01); *F02D 41/1441* (2013.01); *F02D 2041/3881* (2013.01); *F02D 2200/0611* (2013.01); *Y02T 10/36* (2013.01)

(58) Field of Classification Search
CPC ......... F02D 19/0689; F02D 2041/3881; F02D 41/008; F02D 41/0025; F02D 19/0605; F02D 2200/0611; F02D 41/3094; F02D 19/0692; F02D 19/084; F02D 19/087; Y02T 10/36
USPC ........ 701/103, 104; 123/304, 525, 575, 576, 123/577
See application file for complete search history.

(56) References Cited

U.S. PATENT DOCUMENTS

| | | | | |
|---|---|---|---|---|
| 8,566,004 B2* | 10/2013 | Annoura | F02D 19/0628 | 123/486 |
| 9,399,945 B2* | 7/2016 | Matsuda | F02D 13/0207 | |
| 9,617,960 B2* | 4/2017 | Saito | F02M 51/00 | |
| 2005/0097888 A1* | 5/2005 | Miyashita | F02D 41/007 | 60/602 |
| 2005/0098154 A1* | 5/2005 | Ohtani | F02D 41/1498 | 123/431 |
| 2005/0274353 A1* | 12/2005 | Okubo | F02D 41/0042 | 123/299 |
| 2008/0060627 A1* | 3/2008 | Bromberg | F02B 47/04 | 123/575 |
| 2008/0168966 A1* | 7/2008 | Bromberg | F02B 47/04 | 123/528 |
| 2008/0312805 A1* | 12/2008 | Hirata | F02D 19/0605 | 701/103 |
| 2009/0093945 A1* | 4/2009 | Okumura | F02D 41/1494 | 701/103 |
| 2009/0095546 A1* | 4/2009 | Zubeck | F02B 1/02 | 180/54.1 |
| 2009/0112442 A1* | 4/2009 | Tsunooka | F02D 19/088 | 701/103 |
| 2009/0178654 A1* | 7/2009 | Leone | F02M 31/125 | 123/528 |
| 2009/0251302 A1* | 10/2009 | Cunningham | F02D 19/0628 | 340/438 |
| 2009/0292442 A1* | 11/2009 | Leone | F02B 17/005 | 701/103 |
| 2009/0292444 A1* | 11/2009 | Russell | F02D 35/027 | 701/103 |
| 2009/0308367 A1* | 12/2009 | Glugla | F02D 19/081 | 123/575 |
| 2010/0024772 A1* | 2/2010 | Lewis | F02D 19/084 | 123/446 |
| 2010/0024780 A1* | 2/2010 | Hilditch | F02D 41/0025 | 123/514 |
| 2010/0024789 A1* | 2/2010 | Lippa | F02D 19/0684 | 123/672 |
| 2010/0030451 A1* | 2/2010 | Lippa | F02D 19/0684 | 701/104 |
| 2010/0070156 A1* | 3/2010 | Cohn | F02B 47/04 | 701/103 |
| 2010/0116244 A1* | 5/2010 | Lewis | F01N 11/007 | 123/299 |
| 2010/0145596 A1 | 6/2010 | Nishimura | | |
| 2011/0046866 A1* | 2/2011 | Fabien | B60W 10/06 | 701/104 |
| 2011/0073057 A1* | 3/2011 | Lippa | F02D 19/0684 | 123/1 A |
| 2011/0132340 A1* | 6/2011 | Soltis | F02D 41/0025 | 123/703 |
| 2011/0132342 A1* | 6/2011 | Soltis | F02D 41/0025 | 123/703 |
| 2011/0137539 A1* | 6/2011 | Jankovic | F02D 41/0025 | 701/103 |
| 2011/0180041 A1 | 7/2011 | Falkowski et al. | | |
| 2011/0203553 A1* | 8/2011 | Chiba | F02D 13/0215 | 123/478 |
| 2011/0253117 A1* | 10/2011 | Jankovic | F02D 41/0025 | 123/704 |
| 2011/0288751 A1* | 11/2011 | Kurtz | F02D 41/0025 | 701/109 |
| 2011/0308501 A1* | 12/2011 | Sato | F02D 19/0628 | 123/520 |
| 2012/0029795 A1* | 2/2012 | Surnilla | F02D 35/027 | 701/111 |
| 2012/0048231 A1* | 3/2012 | Bromberg | F02B 47/04 | 123/304 |
| 2012/0166065 A1* | 6/2012 | Lewis | F02D 41/0025 | 701/103 |
| 2012/0167859 A1* | 7/2012 | Basmaji | F02D 19/0605 | 123/456 |
| 2014/0216394 A1* | 8/2014 | Matsuda | F02D 13/0223 | 123/295 |
| 2014/0224209 A1* | 8/2014 | Pursifull | F02M 63/0001 | 123/294 |

FOREIGN PATENT DOCUMENTS

| | | |
|---|---|---|
| JP | 2009-174465 A | 8/2009 |
| JP | 2011-247110 A | 12/2011 |

* cited by examiner

CONTROL DEVICE FOR INTERNAL COMBUSTION ENGINE

CROSS-REFERENCE TO RELATED APPLICATION

This is a national phase application based on the PCT International Patent Application No. PCT/JP2012/067389 filed Jul. 6, 2012, the entire contents of which are incorporated herein by reference.

TECHNICAL FIELD

The present invention relates to a control device for an internal combustion engine that is capable of using a fuel in which different kinds of fuel are mixed, for example, a fuel in which an alcohol and a hydrocarbon-based fuel are mixed, and that can inject a mixed fuel from both a port injection valve that injects fuel into an intake port and an in-cylinder injection valve that injects fuel directly into a cylinder.

BACKGROUND ART

An FFV internal combustion engine that is capable of using a fuel in which different kinds of fuel are mixed is known as an internal combustion engine for an automobile. A fuel which contains a mixture of an alcohol such as ethanol and a hydrocarbon-based fuel such as gasoline is a typical mixed fuel that is used by an FFV internal combustion engine. A dual-injection internal combustion engine is also known which is equipped with a port injection valve that injects fuel into an intake port and an in-cylinder injection valve that injects fuel directly into a cylinder, and which can change an injection ratio between the two fuel injection valves in accordance with the operating state. Further, Japanese Patent Laid-Open No. 2006-214415 discloses technology relating to a dual-injection internal combustion engine for an FFV that combines the two features of the above described two kinds of internal combustion engines. That is, the technology disclosed in Japanese Patent Laid-Open No. 2006-214415 relates to an internal combustion engine that is equipped with an in-cylinder injection valve and a port injection valve and that is capable of injecting a mixed fuel (in the example in the aforementioned publication, an alcohol-mixed fuel) from both fuel injection valves.

In the conventional FFV internal combustion engine that uses an alcohol-mixed fuel, engine control is performed by a method that is in accordance with the alcohol concentration of the fuel. More specifically, because the heating value per unit volume decreases as the alcohol concentration of fuel increases, the fuel injection amount is determined according to the alcohol concentration of the fuel. The reason for this is that if the fuel injection amount is excessive, emissions will increase, while if the fuel injection amount is insufficient, the drivability will deteriorate. Further, the higher that the alcohol concentration of the fuel is, the faster that the combustion rate will be, and the exhaust gas temperature is liable to decrease by a corresponding amount. Consequently, the ignition timing is determined in accordance with the alcohol concentration of the fuel. This is because the exhaust gas temperature is increased by retarding the ignition timing, and as a result emissions are reduced. However, there is also the contrary situation that if the ignition timing is retarded too much, the drivability will deteriorate. For such reasons, in the conventional FFV internal combustion engine, in order to achieve both a reduction in emissions and suppression of a deterioration in drivability in a compatible manner, the fuel injection amount and the ignition timing are optimally controlled in accordance with the alcohol concentration of the fuel.

In this connection, a plurality of kinds of alcohol-mixed fuel that have different alcohol concentrations to each other are commercially available as alcohol-mixed fuels. Consequently, when refueling a vehicle, it is possible that fuel having an alcohol concentration that is different to the alcohol concentration of the fuel that is currently being used will be added to the fuel tank. In this case, although the alcohol concentration in the fuel tank will change in accordance with the refueling amount, the alcohol concentration of fuel that has already been sucked up from the fuel tank before refueling, that is, residual fuel in the fuel supply line, is maintained as it is at the alcohol concentration prior to refueling. As a result, fuel having the same alcohol concentration as prior to refueling is injected from the fuel injection valves for a while after refueling is performed, and thereafter fuel whose alcohol concentration was changed by refueling is injected from the fuel injection valves.

In the conventional FFV internal combustion engine, the alcohol concentration of the fuel is learned based on a feedback correction amount of air-fuel ratio feedback control, and engine control is performed based on the learned alcohol concentration. Consequently, when the alcohol concentration of fuel that is injected from a fuel injection valve changes accompanying refueling, engine control that is based on an unstable alcohol concentration is performed during a period until a switch from the pre-refueling fuel to the post-refueling fuel is completed. Hence, in the conventional FFV internal combustion engine, there is a possibility that emissions will increase and the drivability will deteriorate during a period in which the fuel that is injected from the fuel injection valves is being switched from the pre-refueling fuel to the post-refueling fuel.

The above described problem is particularly noticeable in a dual-injection internal combustion engine as described in the aforementioned patent literature. A dual-injection internal combustion engine is equipped with an in-cylinder injection valve and a port injection valve for each cylinder, and fuel supply lines for distributing fuel to the fuel injection valves of each cylinder are arranged for the fuel injection valve and the port injection valve, respectively. Furthermore, the fuel injection amounts of the two fuel injection valves are not the same, and the injection ratio between the two fuel injection amounts is changed in accordance with the operating state of the internal combustion engine. Therefore, a difference arises between the fuel supply line for the in-cylinder injection valve and the fuel supply line for the port injection valve with respect to the time period until the fuel inside the respective fuel supply lines is completely switched from the pre-refueling fuel to the post-refueling fuel. As a result, in a dual-injection internal combustion engine, a state in which the alcohol concentration of fuel injected from a port injection valve and the alcohol concentration of fuel injected from an in-cylinder injection valve are different to each other continues for a long time period, and because the alcohol concentration of the injected fuel with respect to the internal combustion engine overall is not stable during that time period, an increase in emissions and a deterioration in drivability are liable to occur in comparison to a single-injection internal combustion engine that includes only in-cylinder injection valves or port injection valves.

CITATION LIST

Patent Literature

Patent Literature 1: Japanese Patent Laid-Open No. 2006-214415

SUMMARY OF INVENTION

The above described problem is not limited to a dual-injection internal combustion engine that uses an alcohol-mixed fuel. The problem applies to all dual-injection internal combustion engines that use a mixed fuel that is a fuel in which different kinds of fuel are mixed, and for which the mixing ratio of different kinds of fuel can change significantly when refueling is performed. Note that, the term "mixing ratio of different kinds of fuel" refers to, for example, a mixing ratio of any fuel in which an alcohol and gasoline are mixed, and the mixing ratio can be expressed as an alcohol concentration contained in the fuel or as a gasoline concentration contained in the fuel.

The present invention has been made to solve the above described problem, and an object of the present invention is, in a dual-injection internal combustion engine that is capable of using a fuel in which different kinds of fuel are mixed, to enable the elimination at an early stage of a difference in fuel concentrations between injection valves that can arise when there is a significant change in the mixing ratio of different kinds of fuel contained in the fuel that is used. To achieve the aforementioned object, the present invention provides a control device for an internal combustion engine that is configured so as to operate in the manner described hereunder.

Normally, a control device according to the present invention controls a fuel injection amount of an in-cylinder injection valve and a fuel injection amount of a port injection valve in accordance with an operating state of the internal combustion engine. More specifically, an injection ratio between the fuel injection amount of the in-cylinder injection valve and the fuel injection amount of the port injection valve is determined in accordance with the operating state of the internal combustion engine. The injection ratio is this case is set in a range that includes 0:1 or 1:0, and more preferably is set in a range from 0:1 to 1:0. If the injection ratio is 0:1, fuel injection is performed by only the port injection valve, and if the injection ratio is 1:0, fuel injection is performed by only the in-cylinder injection valve. There are merits and demerits relating to the operating state of the internal combustion engine in each of these injection forms. Hence, the merits of the respective injection form can be utilized to the maximum extent by not fixing the injection ratio, and instead changing the injection ratio in accordance with the operating state of the internal combustion engine.

However, in a case where a change is detected in the mixing ratio of different kinds of fuel contained in the fuel that is used, or in a case where the possibility of a change in the mixing ratio of different kinds of fuel contained in the fuel that is used is detected, the control device according to the present invention does not control the fuel injection amount of each injection valve in accordance with the operating state of the internal combustion engine, but instead controls the fuel injection amount of each injection valve so that fuel is injected from both the in-cylinder injection valve and the port injection valve.

Specifically, the control device according to the present invention changes a mode relating to determination of the injection ratio to a special mode that is different from the normal mode. In the special mode, the control device according to the present invention sets the injection ratio to a ratio that is within a range that excludes 0:1 and 1:0. That is, in this case the control device according to the present invention does not allow fuel injection by only the port injection valve or fuel injection by only the in-cylinder injection valve, but instead causes fuel to be always injected by both of the fuel injection valves. By setting the injection ratio in this way, fuel that was sucked up from the fuel tank prior to refueling and remains in both a fuel supply line that connects to the in-cylinder injection valve and a fuel supply line that connects to the port injection valve can be reliably consumed. It is thereby possible to eliminate at an early stage a situation in which a mixing ratio of different kinds of fuel contained in the fuel injected from the port injection valve and a mixing ratio of different kinds of fuel contained in the fuel injected from the in-cylinder injection valve are different to each other. Note that, although the injection ratio in the special mode may be variable as long as the injection ratio is in a range that excludes 0:1 and 1:0, a configuration may also be adopted in which the injection ratio is fixed to a predetermined ratio that excludes 0:1 and 1:0 in order to promote consumption of the fuel remaining in both fuel supply lines.

Operation in the aforementioned special mode is ended when a certain condition is satisfied. After the special mode ends, the injection ratio is set again in the normal mode. The elapse of a certain time period from the time of switching to the special mode can be mentioned as one example of a condition for ending the special mode. Preferably, a condition that an integrated amount of fuel injected from the port injection valve exceeds a threshold value and, furthermore, an integrated amount of fuel injected from the in-cylinder injection valve exceeds a threshold value is adopted as a condition for ending the special mode. Although the respective threshold values may be the same value, it is more preferable if the respective threshold values are set in accordance with the capacity of the respective fuel supply lines.

More preferably, the special mode is ended upon confirming that the mixing ratio of different kinds of fuel contained in the fuel injected from the in-cylinder injection valve and the mixing ratio of different kinds of fuel contained in the fuel injected from the port injection valve have both changed and are approximately equal to each other. As the confirmation method, a method may be adopted that changes the injection ratio to a ratio that is equal to or greater than a predetermined ratio, and checks an amount of change in an output value of an air-fuel ratio sensor at that time. If there is no longer a difference between the respective mixing ratios of different kinds of fuel with respect to the fuel injected from the port injection valve and the fuel injected from the in-cylinder injection valve, the output value of the air-fuel ratio sensor will show little change with respect to before and after the time that the injection ratio was changed. Hence, whether or not the mixing ratio of different kinds of fuel contained in the fuel injected from the port injection valve and the mixing ratio of different kinds of fuel contained in the fuel injected from the in-cylinder injection valve have become substantially equal can be confirmed based on whether or not the amount of change in the output value of the air-fuel ratio sensor at such time or the amount of change in a parameter calculated based on the output value is less than a threshold value.

A change in the mixing ratio of different kinds of fuel contained in the fuel that is used can be directly detected by means of a sensor. For example, in a case where a concentration sensor that corresponds to a specific fuel component is provided in a fuel supply system, a change in the mixing ratio of different kinds of fuel contained in the fuel that is used can be detected based on a change in the output value of the concentration sensor. With respect to the position at which to dispose the concentration sensor, it is preferable to dispose the concentration sensor at a position that is before a branch point at which a fuel supply line that extends from a discharge port of a fuel pump branches into a line that is connected to the in-cylinder injection valve and a line that is connected to the port injection valve. Naturally, the concentration sensor may also be disposed inside the fuel tank.

Note that, when using a fuel in which different kinds of fuel are mixed, in some cases there may be a change over time in the mixing ratio. The reason is that the volatility of each fuel component is different, and therefore a highly volatile fuel component evaporates inside the fuel tank, and as a result a change arises in the mixing ratio. However, this kind of change over time is an extremely small change and, for example, the level of the change differs greatly from a case in which fuel was added to the fuel inside the fuel tank by refueling. Hence, in the case of using a concentration sensor to detect a change in the mixing ratio of different kinds of fuel contained in the fuel that is used, it is preferable that a threshold value that can be distinguished from a change over time is previously determined, and a change in the output value that exceeds the threshold value is detected.

Further, the possibility of a change in the mixing ratio of different kinds of fuel contained in the fuel that is used can be indirectly detected by, for example, detecting at least either one of a fact that refueling into the fuel tank was performed and a fact that refueling into the fuel tank will be performed. This is because, in a case where refueling was performed, there is a possibility that the fuel that was inserted into the fuel tank is fuel in which the mixing ratio of different kinds of fuel is different to the mixing ratio of different kinds of fuel contained in the residual fuel that was inside the fuel tank prior to the refueling operation. A fact that refueling was performed can be detected based on a change in an output value of a residual fuel amount sensor, while a fact that refueling will be performed hereafter can be detected based on opening/closing of a refueling port. To detect opening/closing of a refueling port, a sensor may be disposed at the refueling port so as to detect opening/closing of the refueling port based on an output value of the sensor, or an operation of a switch or a lever for opening the refueling port may be detected.

Further, the possibility of a change in the mixing ratio of different kinds of fuel contained in the fuel that is used may also be detected by detecting at least one of a fact that the internal combustion engine was started and a fact that the internal combustion engine will be started. The possibility that the mixing ratio of different kinds of fuel contained in the fuel that is used will suddenly change during operation of the internal combustion engine is extremely low. A time at which such a possibility exists is when refueling was performed while the internal combustion engine is stopped, and the effect thereof appears when the internal combustion engine is started. Hence, by detecting at least one of a fact that the internal combustion engine was started and a fact that the internal combustion engine will be started and determining on the basis thereof that there is a possibility of a change arising in the mixing ratio of different kinds of fuel contained in the fuel that is used, the influence that refueling of a mixed fuel has on operation of the internal combustion engine can be alleviated further. A fact that the internal combustion engine was started or is will be started can be detected by checking a start request signal that is used in start-up control of the internal combustion engine, or by checking a result determined by a start-up determination operation.

If a concentration sensor is provided in the fuel supply system, ignition timing control and fuel injection amount control can be performed based on a mixing ratio of different kinds of fuel that is estimated based on an output value of the concentration sensor.

Further, because it is possible to calculate a mixing ratio of different kinds of fuel contained in injected fuel based on a feedback correction amount that relates to air-fuel ratio feedback control, it is also possible to determine an ignition timing and a fuel injection amount based on the mixing ratio of different kinds of fuel that is calculated based on the feedback correction amount. However, in a dual-injection internal combustion engine that combines the use of a port injection valve and an in-cylinder injection valve, in a case where the mixing ratio of different kinds of fuel contained in the fuel that is used changed due to refueling, an accurate mixing ratio of the different kinds of fuel cannot be obtained based on the feedback correction amount until the fuel that is injected is completely switched from pre-refueling residual fuel to post-refueling fuel. Hence, if a concentration sensor is provided in the fuel supply system, in a case where there is a change in the output value of the concentration sensor, it is preferable to determine the ignition timing and the fuel injection amount based on a range of the mixing ratio of different kinds of fuel that is estimated based on the output value of the concentration sensor.

DESCRIPTION OF EMBODIMENT

An embodiment of the present invention will now be described with reference to the accompanying drawings.

Figure 1:
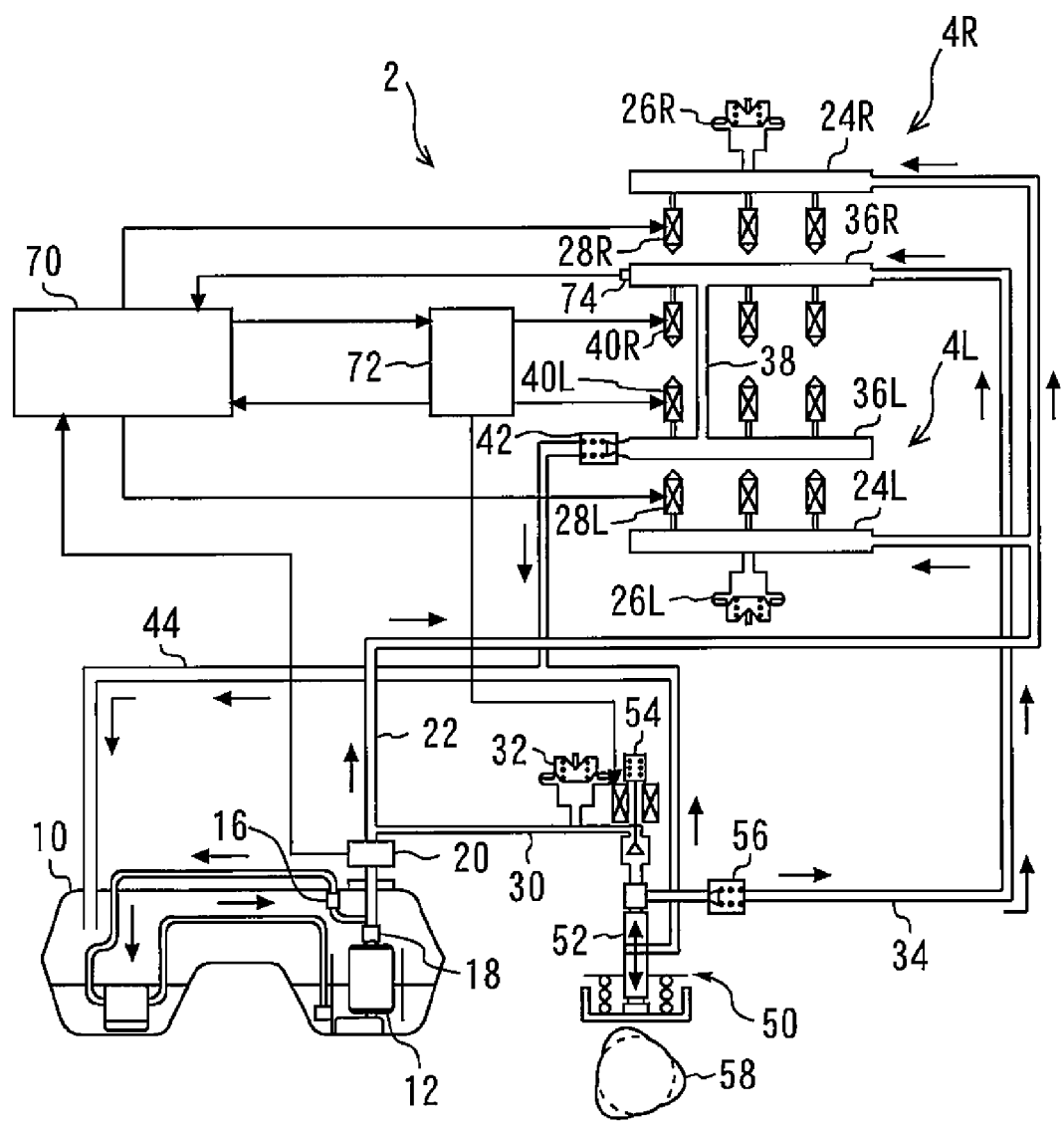
FIG. 1 is a schematic diagram illustrating the configuration of a fuel supply system of an internal combustion engine in which the control device according to the present invention is used.

FIG. 1 is a schematic diagram illustrating the configuration of a fuel supply system of an internal combustion engine (hereunder, referred to as "engine") to which the control device according to the present invention is applied in the present embodiment. An engine 2 according to the present embodiment is a V-type six-cylinder engine having three cylinders in each of a left bank 4L and a right bank 4R, and is an FFV engine that is capable of using a fuel in which an alcohol (in this case, ethanol) and a hydrocarbon-based fuel (in this case, gasoline) are mixed. Furthermore, the engine 2 is a dual-injection engine that combines the use of port injection and in-cylinder direct injection.

Port injection valves 28L and 28R that inject fuel into an intake port are provided in each cylinder of the engine 2. The port injection valves 28L of the three cylinders of the left bank 4L are connected to a low-pressure delivery pipe 24L, and the port injection valves 28R of the three cylinders of the right bank 4R are connected to a low-pressure delivery pipe 24R. The left and right low-pressure delivery pipes 24L and 24R are both connected to a low-pressure fuel pipe 22. Pulsation dampers 26L and 26R for suppressing pressure pulsations of fuel are attached to the low-pressure delivery pipes 24L and 24R, respectively.

The low-pressure fuel pipe 22 is connected to a discharge port of a feed pump (low-pressure fuel pump) 12. The feed pump 12 is disposed inside a fuel tank 10 which stores ethanol-mixed gasoline as a fuel. An ethanol concentration sensor 20 for measuring the ethanol concentration of the fuel is attached to the low-pressure fuel pipe 22. In addition, a filter 18 and a pressure regulator 16 are provided in the low-pressure fuel pipe 22. The pressure regulator 16 keeps the fuel pressure in the low-pressure fuel pipe 22 at a pressure that is equal to or less than a predetermined pressure by opening when the fuel pressure in the low-pressure fuel pipe 22 exceeds a predetermined pressure (for example, 400 kPa) to thereby return fuel inside the low-pressure fuel pipe 22 to the fuel tank 10.

Furthermore, in-cylinder injection valves 40L and 40R that inject fuel directly into a cylinder are provided in each cylinder of the engine 2. The in-cylinder injection valves 40L of the three cylinders of the left bank 4L are connected to a high-pressure delivery pipe 36L, and the in-cylinder injection valves 40R of the three cylinders of the right bank 4R are connected to a high-pressure delivery pipe 36R. The two high-pressure delivery pipes 36L and 36R are connected by a connection pipe 38, and the high-pressure delivery pipe 36R that is one of the high-pressure delivery pipes 36L and 36R is connected to a high-pressure fuel pipe 34. A fuel pressure sensor 74 is attached to the high-pressure delivery pipe 36R that is one of the high-pressure delivery pipes, and a relief valve 42 is attached to the high-pressure delivery pipe 36L that is the other of the high-pressure delivery pipes. The relief valve 42 keeps the fuel pressure in the high-pressure delivery pipes 36L and 36R at a pressure that is equal to or less than a predetermined pressure by opening when the fuel pressure in the high-pressure delivery pipes 36L and 36R exceeds a predetermined pressure (for example, 15.3 MPa) to thereby return fuel inside the high-pressure delivery pipes 36L and 36R to the fuel tank 10 through the return pipe 44.

The high-pressure fuel pipe 34 is connected to a discharge port of a high-pressure fuel pump 50. The aforementioned low-pressure fuel pipe 22 branches downstream of the position at which the ethanol concentration sensor 20 is mounted. The high-pressure fuel pump 50 is connected to the high-pressure fuel pipe 34 and a low-pressure fuel pipe 30 that is the pipe that branches from the low-pressure fuel pipe 22. The high-pressure fuel pump 50 includes: a plunger 52 that, by being driven by a cam 58, sucks in fuel from the low-pressure fuel pipe 30, pressurizes the fuel, and discharges the fuel to the high-pressure fuel pipe 34; an electromagnetic spill valve 54 that adjusts the amount of fuel sucked in by the plunger 52; and a check valve 56 that opens when the pressure of fuel that is sucked in from the plunger 52 exceeds a predetermined pressure (for example, 60 kPa). Further, a pulsation damper 32 for suppressing pressure pulsations of fuel is attached to the low-pressure fuel pipe 30 that is connected to the high-pressure fuel pump 50.

In the fuel supply system of the engine 2 configured as described above, the port injection valves 28L and 28R are directly driven by an engine control computer 70. On the other hand, the in-cylinder injection valves 40L and 40R and the electromagnetic spill valve 54 are driven via a driver circuit 72 by the engine control computer 70. Various kinds of information relating to the operating state of the engine 2 is input to the engine control computer 70 from various sensors such as the fuel pressure sensor 74 and the ethanol concentration sensor 20. Based on the various kinds of sensor information as well as setting value information that is previously stored in a memory and the like, the engine control computer 70 operates various actuators including the port injection valves 28L and 28R, the in-cylinder injection valves 40L and 40R and the electromagnetic spill valve 54 in accordance with a control program stored in a ROM.

Control of the engine 2 that is executed by the engine control computer 70 in the present embodiment includes fuel injection control that is performed by operating the port injection valves 28L and 28R and the in-cylinder injection valves 40L and 40R. An injection ratio between port injection and in-cylinder direct injection is controlled by the fuel injection control. Normally, the engine control computer 70 determines the injection ratio in accordance with the operating state of the engine 2, more specifically, in accordance with values of various physical quantities that indicate the operating state of the engine 2, such as the engine rotation speed, the load and the water temperature. A specific example thereof will now be described. When the engine is warm, only in-cylinder direct injection is performed in an idle state, under a partial load the injection ratio is changed in accordance with the load, and in a WOT state only in-cylinder direct injection is performed. When the engine is cold, only port injection is performed in an idle state, under a partial load the injection ratio is changed in accordance with the load, and in a case where rapid warming of a catalyst is requested, injection sharing is performed at a predetermined injection ratio. On the other hand, only port injection is performed in the case of a very low temperature, irrespective of the load. The relation between the various physical quantities and the injection ratio is defined in a map, and the engine control computer 70 refers to the map to determine the injection ratio.

However, in a case where refueling of the vehicle is performed and the ethanol concentration of fuel in the fuel tank 10 changes as a result, the engine control computer 70 changes the injection ratio to a setting that is different from normal. That is, the engine control computer 70 changes a setting mode for the injection ratio from a normal mode to a special mode. Further, normally the engine control computer 70 performs air-fuel ratio feedback control based on an output value of an air-fuel ratio sensor that is disposed in an exhaust passage, and also calculates the ethanol concentration of the fuel based on a feedback correction amount. The engine control computer 70 then determines the ignition timing based on the ethanol concentration obtained based on the feedback correction amount, and determines the fuel injection amounts to be injected by the respective fuel injection valves 40L, 40R, 28L, and 28R based on the aforementioned ethanol concentration. However, in a case where the ethanol concentration of fuel inside the fuel tank 10 changed as the result of refueling, the engine control computer 70 also changes the method for determining the ignition timing and the fuel injection amounts to a method that is different from the normal method. Hereunder, the details of engine control that the engine control computer 70 executes in the present embodiment will be described using FIG. 2.

Figure 2:
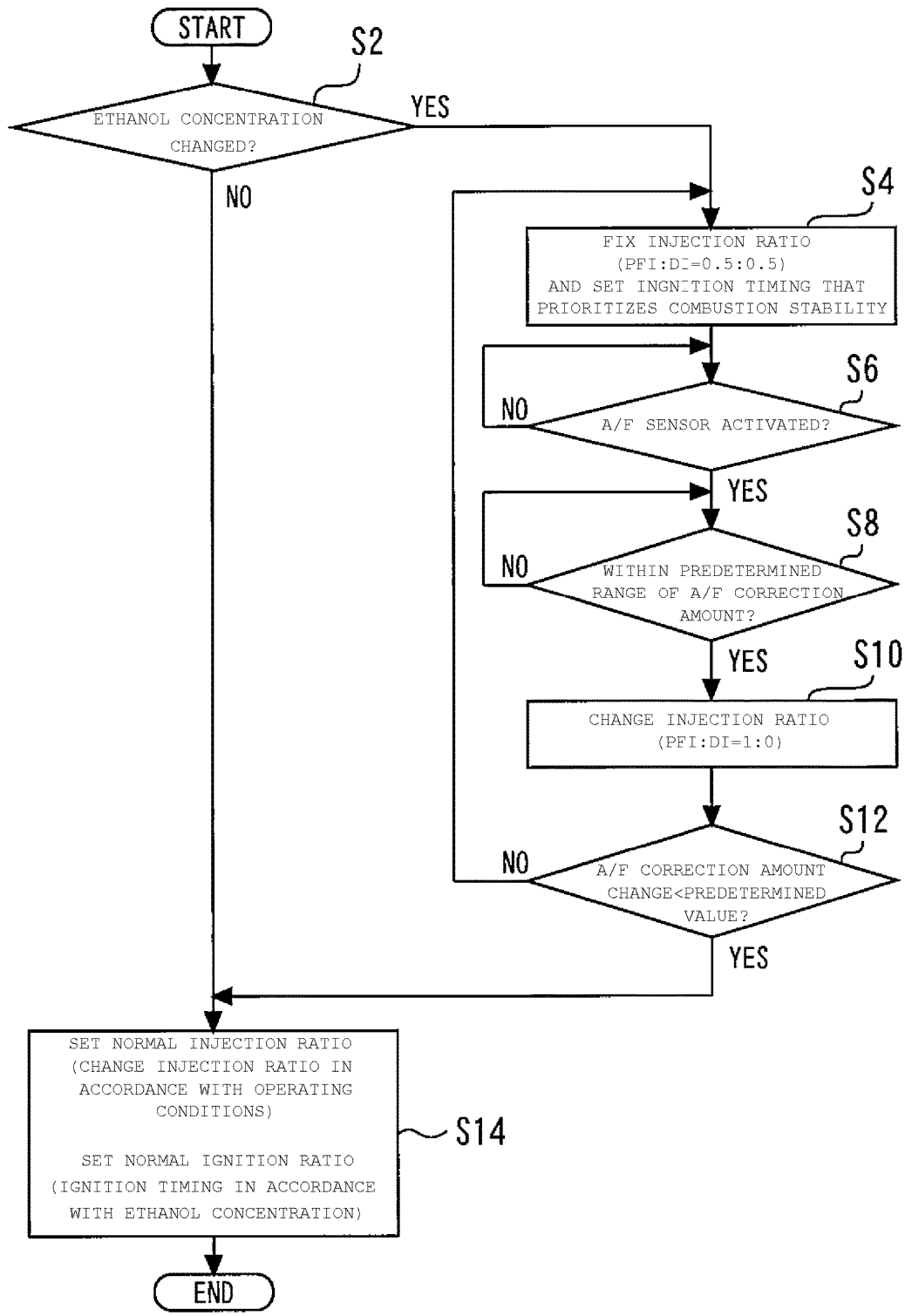
FIG. 2 is a flowchart illustrating a routine of engine control that is executed in an embodiment of the present invention.

FIG. 2 is a flowchart illustrating a routine of engine control that is executed by the engine control computer 70 in the present embodiment. First, in step S2, the engine control computer 70 determines whether or not the ethanol concentration of the fuel in the fuel tank 10 changed as the result of refueling. If refueling was not performed or if refueling was performed and fuel having the same ethanol concentration as the fuel already in the fuel tank 10 was inserted into the fuel tank 10, the result determined in step S2 is negative. In that case, the processing by the engine control computer 70 advances to step S14. In step S14, the engine control computer 70 sets the injection ratio between port injection and in-cylinder direct injection to the normal injection ratio, that is, to an injection ratio in accordance with the operating state of the engine 2. Further, the engine control computer 70 sets the ignition timing in accordance with an ethanol concentration that is calculated based on the feedback correction amount, and also determines the fuel injection amount based on the same ethanol concentration.

The determination in step S2 is performed based on a change in the output value of the ethanol concentration sensor 20. If fuel having a different ethanol concentration to that of the fuel in the fuel tank 10 is inserted into the fuel tank 10, the ethanol concentration of the fuel in the fuel tank 10 will change significantly. The engine control computer 70 detects such a change in the ethanol concentration based on a change in the output value of the ethanol concentration sensor 20. That is, the engine control computer 70 detects a change in the output value of the ethanol concentration sensor 20 as a change in the ethanol concentration of the fuel that is used, that is, a change in the mixing ratio of the different kinds of fuel contained in the fuel that is used. However, in some cases a change over time arises in the ethanol concentration of the fuel in the fuel tank 10. The reason is that because a highly volatile fuel component evaporates inside the fuel tank 10, a change arises in the mixing ratio between the ethanol and gasoline as a result. In the determination performed in step S2, in order to distinguish a change in the ethanol concentration caused by refueling from such a change over time, the engine control computer 70 determines that the ethanol concentration of the fuel that is used changed as the result of refueling only in a case where the amount of change in the output value of the ethanol concentration sensor 20 exceeds a threshold value. In such a case, the processing by the engine control computer 70 advances to step S4.

In step S4, the engine control computer 70 fixes the injection ratio between the in-cylinder direct injection (DI) and the port injection (PFI) to a ratio of 0.5:0.5. The fixed injection ratio is not changed even if the engine rotation speed of the load changes. Hence, during idle operation when the engine is warm, although normally the injection ratio between port injection and in-cylinder direct injection is set to 0:1, according to the processing of the present step, fuel is always injected from the port injection valves 28L and 28R also. Further, at a very low temperature, although normally the injection ratio between port injection and in-cylinder direct injection is set to 1:0, according to the processing of the present step, fuel is always injected from the in-cylinder injection valves 40L and 40R also. That is, as a result of the processing of the present step being executed, fuel is always injected from both of the different kinds of fuel injection valves 40L, 40R, 28L and 28R regardless of the operating state of the engine 2. Consequently, fuel in the fuel supply lines on both the in-cylinder injection valve side and the port injection valve is consumed, and thus the pre-refueling residual fuel that was in the respective fuel supply lines is replaced with the fuel whose ethanol concentration was changed by refueling.

In this connection, in the course of the fuel in the respective fuel supply lines being changed from the pre-refueling residual fuel to the fuel whose ethanol concentration was changed by refueling, the ethanol concentration in the fuel that is injected from the two kinds of fuel injection valves also changes. Consequently, an accurate ethanol concentration cannot be obtained based on the feedback correction amount. Furthermore, an ethanol concentration that is calculated based on the feedback correction amount is an overall ethanol concentration with respect to the fuel injected from the two kinds of fuel injection valves, and the ethanol concentration of fuel injected by in-cylinder direct injection and the ethanol concentration of fuel injected by port injection cannot be calculated separately. Consequently, there is a risk of causing a deterioration in combustion when the ignition timing or the fuel injection amount is determined using the ethanol concentration calculated based on the feedback correction amount.

Therefore, in step S4, the engine control computer 70 estimates the ethanol concentration of the fuel based on an output value of the ethanol concentration sensor 20. Further, a range of the ethanol concentration of the fuel that is injected from the two kinds of fuel injection valves is predicted using the ethanol concentration that is estimated based on the output value of the ethanol concentration sensor 20, and the alcohol concentration of the residual fuel from prior to refueling. Subsequently, the fuel injection amount is determined based on the highest ethanol concentration within the predicted ethanol concentration range, and furthermore, to prevent knocking caused by excessive advancement of the ignition timing, a base ignition timing is determined based on the same ethanol concentration. However, in a situation in which warm-up of a catalyst is requested when the engine 2 is cold, to prevent a deterioration in combustion due to excessive retardation of the ignition timing, a retardation amount of the ignition timing is determined based on the lowest ethanol concentration within the predicted ethanol concentration range. That is, in a case where a change arises in the ethanol concentration of the fuel that is used as the result of refueling, the engine control computer 70 determines the fuel injection amounts and the ignition timing based on an ethanol concentration that is estimated based on an output value of the ethanol concentration sensor 20, and not an ethanol concentration calculated based on a feedback correction amount relating to the air-fuel ratio feedback control.

Next, in step S6, the engine control computer 70 determines whether or not the air-fuel ratio sensor (A/F sensor) is activated. The determination in step S6 is performed based on, for example, the engine water temperature, an integrated value of the intake air amount after engine start-up, the frequency of the aforementioned fuel injection after engine start-up and the like. If the engine control computer 70 can confirm that the air-fuel ratio sensor has been activated, next, in step S8, the engine control computer 70 determines whether or not an air-fuel ratio correction amount (A/F correction amount) that is calculated based on the output value of the air-fuel ratio sensor is within a predetermined range. The predetermined range can be determined, for example, based on an ethanol concentration that is estimated based on the output value of the ethanol concentration sensor 20. If the engine control computer 70 confirms that the air-fuel ratio correction amount is within the predetermined range, the processing by the engine control computer 70 advances to step S10.

In step S10, the engine control computer 70 changes the injection ratio between port injection and in-cylinder direct injection to a ratio of 1:0. That is, the engine control computer 70 stops fuel injection by the in-cylinder injection valves 40L and 40R, and executes only fuel injection by the port injection valves 28L and 28R.

Next, in step S12, the engine control computer 70 determines whether or not the amount of change in the air-fuel ratio correction amount that accompanies the change in the injection ratio is less than a predetermined value. The predetermined value used in this determination is set to a sufficiently small value of a level such that the air-fuel ratio correction amount prior to a change in the injection ratio and the air-fuel ratio correction amount after a change in the injection ratio can be regarded as equal. The air-fuel ratio correction amount prior to the change in the injection ratio corresponds to the ethanol concentration of the entire fuel that is injected that is a combination of the fuel injected by in-cylinder direct injection and the fuel injected by port injection. On the other hand, the air-fuel ratio correction amount after the change in the injection ratio corresponds to only the ethanol concentration of fuel injected by port injection. Hence, a difference between the air-fuel ratio correction amounts with respect to before and after the change in the injection ratio means that a difference exists between the ethanol concentration of the fuel injected by in-cylinder direct injection and the ethanol concentration of the fuel injected by port injection. Furthermore, this also means that replacement of fuel has not been fully completed in either of the fuel supply line on the in-cylinder injection valve side and the fuel supply line on the port injection valve side.

Hence, if the result determined in step S12 is that the amount of change in the air-fuel ratio correction amount is not less than the predetermined value, the processing by the engine control computer 70 returns again to step S4. The injection ratio between the port injection and the in-cylinder direct injection is then changed to 0.5:0.5 and fixed at that ratio. As a result, fuel is again consumed in the fuel supply lines on both the in-cylinder injection valve side and the port injection valve side, and replacement of fuel is thus also promoted in the fuel supply line in which replacement of fuel had not been completed. The engine control computer 70 repeatedly executes the processing from step S4 to step S12 until the result of the determination in step S12 is affirmative.

When the result of the determination in step S12 is affirmative, it means that a difference between the alcohol concentration of fuel injected by in-cylinder direct injection and the alcohol concentration of fuel injected by port injection has been eliminated. Furthermore, this means that replacement of fuel has been completed in the fuel supply lines on both the in-cylinder injection valve side and the port injection valve side. Hence, in this case, the processing by the engine control computer 70 advances to step S14. The injection ratio between port injection and in-cylinder direct injection is then changed to a normal injection ratio, that is, an injection ratio that is in accordance with the operating state of the engine 2. Further, the settings for the ignition timing and the fuel injection amounts are changed to settings that are in accordance with the ethanol concentration that is calculated based on the feedback correction amount.

As a result of the engine control computer 70 executing the routine constituted by the respective steps described above, in a case where the ethanol concentration of fuel in the fuel tank 10 changed due to refueling, a situation in which the ethanol concentration of fuel that is injected from the port injection valves 28L and 28R and the ethanol concentration of fuel that is injected from the in-cylinder injection valves 40L and 40R are different to each other can be eliminated at an early stage. As a result, a deterioration in emission performance and in drivability accompanying a decrease in the accuracy of control of the ignition timing and the fuel injection amounts can be suppressed.

In this connection, as a separate method for solving the problem caused by a difference between the ethanol concentration of fuel injected by port injection and the ethanol concentration of fuel injected by in-cylinder direct injection, a method is conceivable in which initially only port injection is performed for a predetermined period, and thereafter the port injection is stopped and only in-cylinder direct injection is performed for a predetermined period. That is, a method is conceivable in which the injection ratio between port injection and in-cylinder direct injection is switched between a ratio of 0:1 and a ratio of 1:0. However, according to this method, there is a possibility of a shock being caused by a sudden change in the ethanol concentration when the injection form is switched, and there is also the possibility that the emission performance will deteriorate due to fluctuations in the air-fuel ratio.

In contrast, according to the engine control of the present embodiment, in a case where the ethanol concentration of fuel inside the fuel tank 10 changed as the result of refueling, since the injection ratio is fixed at 0.5:0.5 irrespective of the operating state of the engine 2, a situation in which the ethanol concentration of injected fuel is changed suddenly due to the operating state can be avoided while promoting the replacement of fuel in the fuel supply lines on both the in-cylinder injection valve side and the port injection valve side.

It is to be understood that the present invention is not limited to the above described embodiment, and various modifications can be made without departing from the spirit and scope of the present invention. For example, in the above described embodiment, only in a case where an ethanol concentration that is calculated based on a feedback correction amount that relates to air-fuel ratio feedback control cannot be utilized, as an alternate method, an ethanol concentration that is estimated based on the output value of the ethanol concentration sensor is used to determine the ignition timing and fuel injection amounts. However, in a control device to which the present invention is applied, a configuration may also be adopted in which the ignition timing and fuel injection amounts are always determined based on an ethanol concentration that is estimated based on the output value of the ethanol concentration sensor, without using an ethanol concentration that is calculated based on the feedback correction amount.

Further, in the above described embodiment a change in the ethanol concentration of fuel is detected based on a change in the output value of the ethanol concentration sensor. However, the act of refueling may itself be detected as a sign that indicates the possibility of a change in the ethanol concentration of the fuel. That is, a configuration may also be adopted so that, upon refueling being detected by means of a residual fuel amount sensor or the like, the injection ratio between port injection and in-cylinder direct injection is fixed to a fixed ratio on the basis that there is a possibility that the ethanol concentration of the fuel changed. In addition, the act of starting the internal combustion engine may be detected as a sign that indicates the possibility of a change in the ethanol concentration of the fuel. This is because refueling is mainly performed at a time that the internal combustion engine is stopped, and the time that the effect of refueling appears is when the internal combustion engine is started.

Furthermore, in the above described embodiment, after the injection ratio was fixed to a fixed ratio, the injection ratio is returned to a ratio for normal control when it is confirmed that a difference between the ethanol concentration of fuel injected by in-cylinder direct injection and the ethanol concentration of fuel injected by port injection has been eliminated. However, a configuration may also be adopted so as to return the injection ratio to a ratio for normal control at a time point at which a fixed time period has elapsed after the injection ratio was fixed at the fixed ratio. Alternatively, a configuration may be adopted so as to return the injection ratio to a ratio for normal control at a time point at which an integrated value of the fuel injected from the respective fuel injection valves reaches a fixed value.

Further, in the above described embodiment the ethanol concentration sensor is disposed at a position that is before a branch point of the low-pressure fuel pipe. However, it is sufficient that the ethanol concentration sensor is located at a position at which the ethanol concentration sensor can detect a change in the ethanol concentration of the fuel in the fuel tank that is caused by refueling before the fuel is injected from the respective fuel injection valves. Hence, the ethanol concentration sensor may also be integrated with the feed pump and provided inside the fuel tank, or may be provided at the refueling port.

Furthermore, the injection ratio between port injection and in-cylinder direct injection that is fixed in step S4 of the above described routine need not necessarily be 0.5:0.5. For example, the injection ratio may be 0.4:0.6 or 0.6:0.4. Further, the injection ratio need not be fixed to a fixed ratio, and may be changed to an injection ratio within a range that excludes 0:1 and 1:0. That is, as long as the injection ratio always causes fuel to be injected from the two kinds of injection valves, the injection ratio may be changed in accordance with the operating state of the engine 2. In order to avoid a situation in which the ethanol concentration of injected fuel changes suddenly according to the operating state, it is preferable to fix the injection ratio to a fixed ratio as in the above described embodiment. However, as long as fuel injection is at least performed from both the two of injection valves, fuel from prior to refueling that remains in both the fuel supply line that connects to the in-cylinder injection valves and the fuel supply line that connects to the port injection valves can be reliably consumed, and replacement of the fuel in both fuel supply lines can be promoted.

In addition, the injection ratio between port injection and in-cylinder direct injection that is changed to in step S10 in the above described routine need not necessarily be 1:0. For example, the injection ratio may be changed to a ratio of 0:1 so as to perform only in-cylinder direct injection. Furthermore, as long as it is possible to change from the injection ratio at the time of a fixed ratio to a ratio that is equal to greater than a predetermined ratio, the injection ratio may be changed to a ratio other than 1:0 or 0:1.

REFERENCE SIGNS LIST

2 Engine
4L Left bank
4R Right bank
10 Fuel tank
12 Feed pump
20 Ethanol concentration sensor
22 Low-pressure fuel pipe
24L, 24R Low-pressure delivery pipe
28L, 28R Port injection valve
34 High-pressure fuel pipe
36L, 36R High-pressure delivery pipe
40L, 40R In-cylinder injection valve
50 High-pressure fuel pump
70 Engine control computer

The invention claimed is:
1. An internal combustion engine, comprising:
a cylinder;
an intake port;
an in-cylinder injection valve which injects fuel directly into the cylinder;
a port injection valve which injects fuel into the intake port;
a fuel tank which stores fuel in which different kinds of fuel are mixed;
a fuel supply system which supplies fuel from the fuel tank to the in-cylinder injection valve and the port injection valve, and
an engine control computer programmed to:
control a fuel injection amount of the in-cylinder injection valve and a fuel injection amount of the port injection valve in accordance with an operating state of the internal combustion engine; and
detect at least one of a change in a mixing ratio of different kinds of fuel contained in a fuel that is used and a possibility of the change; and
only when a change in the mixing ratio of different kinds of fuel contained in the fuel that is used is detected, control a fuel injection amount of the in-cylinder injection valve and a fuel injection amount of the port injection valve so that fuel is injected from both of the in-cylinder injection valve and the port injection valve.

2. The internal combustion engine according to claim 1, wherein the engine control computer detects a change in the mixing ratio of different kinds of fuel contained in the fuel that is used based on a change in an output value of a concentration sensor that corresponds to a specific fuel component.

3. The internal combustion engine according to claim 1, wherein the engine control computer detects at least one of a fact that refueling of fuel into a fuel tank was performed and a fact that refueling of fuel into the fuel tank will be performed as a possibility of a change in a concentration of a fuel component in a fuel that is used.

4. The internal combustion engine according to claim 1, wherein the engine control computer detects at least one of a fact that the internal combustion engine was started and a fact that the internal combustion engine will be started as a possibility of a change in the mixing ratio of different kinds of fuel contained in the fuel that is used.

5. The internal combustion engine according to claim 2, wherein the concentration sensor is disposed at a position that is before a branch point at which a fuel supply line extending from a discharge port of a fuel pump branches into a first fuel supply line that is connected to the in-cylinder injection valve and a second fuel supply line that is connected to the port injection valve.

6. The internal combustion engine according to claim 2, wherein the concentration sensor is integrated with a fuel pump and disposed inside the fuel tank.

7. The internal combustion engine according to claim 1, wherein the engine control computer determines an ignition timing and a fuel injection amount based on a mixing ratio of different kinds of fuel that is estimated based on an output value of a concentration sensor provided in the fuel supply system.

8. The internal combustion engine according to claim 1, wherein the engine control computer, at a normal time when a change in the mixing ratio of different kinds of fuel contained in the fuel that is used or a possibility of the change is not detected, determines an ignition timing and a fuel injection amount based on a mixing ratio of different kinds of fuel that is calculated based on a feedback correction amount relating to air-fuel ratio feedback control, and in a case where at least one of a change in the mixing ratio of different kinds of fuel contained in the fuel that is used and a possibility of the change is detected, determines an ignition timing and a fuel injection amount based on a range of the mixing ratio of different kinds of fuel that is estimated based on an output value of a concentration sensor.

9. The internal combustion engine according to claim 1, wherein, after detecting at least one of a change in the mixing ratio of different kinds of fuel contained in the fuel that is used and a possibility of the change, upon confirming that a mixing ratio of different kinds of fuel contained in fuel injected from the in-cylinder injection valve and a mixing ratio of different kinds of fuel contained in fuel injected from the port injection valve both change to become mixing ratios that are approximately equal to each other, the engine control computer controls a fuel injection amount of the in-cylinder injection valve and a fuel injection amount of the port injection valve based on a ratio that is in accordance with the operating state of the internal combustion engine.

10. The internal combustion engine according to claim 9, wherein the engine control computer confirms that the mixing ratio of different kinds of fuel contained in fuel that is injected from the in-cylinder injection valve and the mixing ratio of different kinds of fuel contained in fuel that is injected from the port injection valve both change to become mixing ratios that are approximately equal to each other by determining whether or not an amount of change in an output value of an air-fuel ratio sensor when a ratio between a fuel injection amount of the in-cylinder injection valve and a fuel injection amount of the port injection valve was changed to a ratio that is equal to or greater than a predetermined ratio or an amount of change in a parameter that is calculated based on the output value is less than a threshold value.

11. The control device for an internal combustion engine according to claim 1, wherein the fuel is a fuel in which an alcohol and a hydrocarbon-based fuel are mixed.

* * * * *